April 2, 1929.   J. L. BAIRD   1,707,935
TELEVISION APPARATUS
Filed Aug. 4, 1926
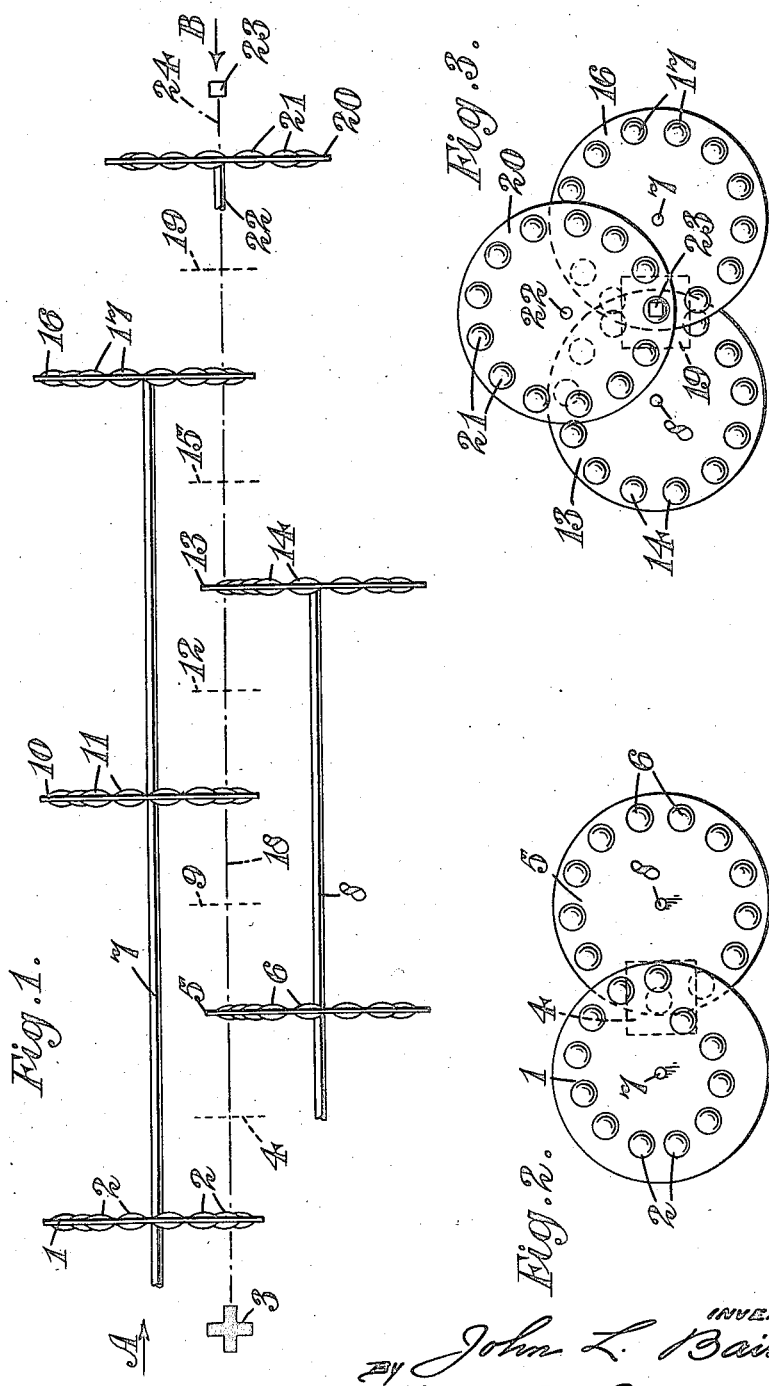

Patented Apr. 2, 1929.

1,707,935

UNITED STATES PATENT OFFICE.

JOHN LOGIE BAIRD, OF HELENSBURGH, SCOTLAND, ASSIGNOR TO TELEVISION LIMITED, OF LONDON, ENGLAND, A BRITISH COMPANY.

TELEVISION APPARATUS.

Application filed August 4, 1926, Serial No. 127,113, and in Great Britain August 6, 1925.

This invention relates to apparatus for transmitting reproductions of views, scenes, images or pictures to a distance, known as television. In a method of television in which an image, or a series of images, of the object being transmitted is caused to traverse a light-sensitive cell, it is necessary that the speed of traversal should be exceedingly rapid to obtain a sufficiently fine subdivision of the image within a reasonable space of time, and previously in such methods, even when using a series of images, produced by a series of image-casting devices, the speed of traversal has been limited by mechanical considerations, since it is impossible to revolve the moving parts at a sufficiently high speed.

According to the present invention, apparatus for transmitting to a distance a reproduction of an object, of the type in which an image of the object is caused to traverse a light-sensitive cell by moving the image-casting device transversely to its optical axis, is characterized in that the image cast on the light-sensitive cell is produced by a plurality of oppositely-moving image-casting devices each of which reprojects the image cast by the preceding device in the plurality. In this way the speed of traversal of the images is increased by what may be described as an optical lever effect, and the increase may be carried to any desired extent whilst maintaining the speed of the mechanism itself within permissible limits.

Further features of the invention are hereinafter described with reference to the accompanying drawings which are quite diagrammatic.

Figure 1 is a plan of the apparatus;

Figure 2 is an end view looking in the direction of the arrow A; and illustrating a slightly modified arrangement of the image-casting device, and Figure 3 is an end view looking in the direction of the arrow B.

Referring to Figure 1, the transmitter consists of a rotatable disc 1 in which is mounted any desired number of circularly arranged lenses 2. In front of the disc is the object 3 or objects, whereof a reproduction is to be transmitted, and behind the disc 2 there may be mounted a ground glass screen 4 or its equivalent, this screen being so placed as to receive an image projected by one of the lenses 2. The line 18 indicates the optical axis of the apparatus along which projection of the images takes place, and when one of the lenses 2 crosses this axis an image is projected upon the screen 4.

Behind the screen 4 is a second rotatable disc 5, also carrying a suitable number of lenses 6, and so positioned that these lenses by rotation of the disc are carried across the optical axis 18. The discs 1 and 5 are mounted on separate shafts 7, 8 which are rotated at any desired speeds; they may be, for example, geared together. The image projected on to the screen 4 constitutes an object of which an image is projected by each of the lenses 6 on to a screen 9 placed behind the disc 5, and the rotation of the shafts 7, 8 is made so that the lenses 2 cross the optical axis 18 in the opposite direction to the lenses 6. With the construction shown, the result is obtained by rotating the discs in the same direction.

The shaft 7 carries a further series of discs each having mounted on it a plurality of circularly arranged lenses as indicated at 10, 11 and 16, 17, these lenses all being arranged to be carried across the optical axis 18 by the rotation of the shaft 7. Similarly, the shaft 8 carries a series of discs each with a plurality of circularly arranged lenses on it as indicated at 13, 14, and these discs are intercalated with the discs on the shaft 7. The lenses on each of the discs as they cross the optical axis 18, reproject successively from the left towards the right in Figure 1, the image cast by the lens on the preceding disc in the series, and as the lenses are moving successively in opposite directions the speed of traversal of each successive image is increased. Any desired number of discs may be used on each shaft so as to provide any desired final speed of traversal of the image.

It will be understood that whilst screens have been indicated at 4, 9, 12, 15, 19, to receive the images successively reprojected, it is not essential that such screens should in fact be used. By this arrangement the separate disc 20 for giving the lateral movements to the image may be eliminated, the disc 20 or its equivalent being required only in the construction shown in Figure 1 in which the lenses are circularly arranged on the discs.

With the arrangement shown, the screen 19 has cast upon it a series of images which are moved at a high speed upwards, (or downwards, according to the direction of rotation of the shafts 7, 8) and if a light-sensitive cell were substituted for this screen, it could be traversed slowly across the moving image to produce the desired exploration of the whole image for reproduction. This relative lateral movement between the series of images and the light-sensitive cell is preferably effected by means of a separate disc 20 which is mounted on a shaft 22 situated above the plane containing the shafts 7, 8 so that the disc 20 overlaps the optical axis 18 of the apparatus. The disc 20 carries a series of lenses 21 which are moved across the optical axis and the above-described disposition of the shafts 7, 8 and 22 provides that the lenses 21 are moved in a direction at right-angles to the direction of the lenses 14, 17. The shaft 22 may be rotated slowly compared with the shaft 7, 8 to give the desired slow lateral movement to the image so as to provide an adequately finely-grained picture. The light-sensitive cell is indicated at 23 in Figure 1, being situated on the optical axis 18.

The lateral movement of the series of images may be effected in any other desired manner. Thus, for example, the lenses on one of the discs could be arranged in a spiral as shown on the disc 1 in Figure 2 instead of in a circle, so that each of the succession of images produced by the lenses of that disc are displaced slightly to one side of the previous image. Also, of course, it will be appreciated that the lateral movement could be produced by means of an oscillating mirror or a rotating polyhedric mirror or mirrors. When a spiral or staggered arrangement of lenses is used, as above mentioned, the lenses nearer the centre of the disc may be so selected that the image projected on the screen approximates to a rectangle instead of being segmental. Instead of discs, cylinders, truncated cones or similar shapes may be used and concave mirrors may replace the lenses as image-casting devices, or any combination of such devices may be used.

To obtain increase of speed of traversal of the image a bank of lenses may be used, say three, each lens casting an image of the object or view being transmitted on to a ground glass screen. As the lenses are adjacent the three images will be almost identical. An image of this screen is then made to traverse a light-sensitive cell by any of the means previously described or known to the art, and by the use of three lenses, the speed is trebled.

Instead of using three fixed lenses a rotatable disc or other suitable form containing a number of lenses may be used so that three, or any suitable number, of images are thrown on the screen, and, at the same time, made to move over it, thus giving a further increase of speed.

The lenses may be arranged to work with more than one cell. For example, a set of nine lenses might be used casting three rows of three images on the screen, each of these three rows operating its own cell which would control its own light source at the receiving station, the light source replacing the cell behind an optical device similar to that at the transmitting station.

I claim:—

1. In apparatus for transmitting to a distance a reproduction of an object, the combination of an image-casting device, means for moving it across the optical axis of the apparatus, a second image-casting device which reprojects the image cast by the first device, means for moving said second device across the optical axis of the apparatus in the opposite direction to the movement of the first device and a light-sensitive cell so positioned that the final image cast by the said second image-casting device is traversed across it.

2. In apparatus for transmitting to a distance a reproduction of an object, the combination of a plurality of image-casting devices whereof the first projects an image of the object and the remainder successively reproject each the image cast by the preceding one, means for moving alternate image-casting devices in opposite directions across the optical axis along which the projection takes place, and a light-sensitive cell so positioned that the final image is traversed across it.

3. In apparatus for transmitting to a distance a reproduction of an object, the combination of an image-casting device, means for moving it across the optical axis of the apparatus, a second image-casting device which reprojects the image cast by the first device, means for moving said second device across the optical axis of the apparatus in the opposite direction to the movement of the first device, a light-sensitive cell so positioned that the final image cast by the said second image-casting device is traversed across it, and means for imparting to the final image a lateral movement relatively to the light-sensitive cell in addition to its traversing movement.

4. In apparatus for transmitting to a distance a reproduction of an object, the combination of a plurality of image-casting devices whereof the first projects an image of the object and the remainder successively reproject each the image cast by the preceding one, means for moving alternate image-casting devices in opposite directions across the optical axis along which the projection takes place, a light-sensitive cell so positioned that the final image is traversed across it, and means for imparting to the final image a lateral movement relatively to the light-sensitive cell in addition to its traversing movement.

5. In apparatus for transmitting to a distance a reproduction of an object, the combination of a mechanically rotatable member, a plurality of image-casting devices arranged in a circle on it, means for rotating said member to carry said image-casting devices successively across the optical axis of the apparatus, a second mechanically rotatable member, a plurality of image-casting devices arranged in a circle on it, and means for rotating said member to carry said image-casting devices successively across the optical axis of the apparatus in the opposite direction to the movement of the first plurality of image-casting devices, and a light-sensitive cell so positioned on the optical axis of the apparatus that the final image is traversed across it.

6. In apparatus for transmitting to a distance a reproduction of an object, the combination of a disc, a plurality of lenses arranged in a circle on said disc, means for rotating said disc to carry said lenses successively across the optical axis of the apparatus, a second disc, a plurality of lenses arranged in a circle on said disc, means for rotating said second disc to carry its lenses successively across the optical axis of the apparatus in the opposite direction to the movement of the lenses of the first disc and a light-sensitive cell so positioned that the images projected by the second set of lenses are traversed across it.

7. In apparatus for transmitting to a distance a reproduction of an object, the combination of two parallel shafts, means operatively connecting them to rotate in the same direction, discs on each shaft intercalated with those on the other shaft and of such dimensions as to overlap the discs on the other shaft on the optical axis of the apparatus when viewed endwise of the shafts, and a plurality of lenses mounted in each disc in the annulus thereof that overlaps the other discs.

8. In apparatus for transmitting to a distance a reproduction of an object, the combination of an image-casting device, the combination of a disc, a plurality of lenses arranged in a circle on said disc, means for rotating said disc to carry said lenses successively across the optical axis of the apparatus, a second disc, a plurality of lenses arranged in a circle on said disc, means for rotating said second disc to carry its lenses successively across the optical axis of the apparatus in the opposite direction to the movement of the lenses on the first disc, a third disc so mounted that it overlaps the optical axis of the apparatus, a plurality of lenses on said disc, means for rotating said disc so that said lenses are carried across the optical axis of the apparatus in a direction at right-angles to the direction of movement of the lenses of the two first-mentioned discs, and a light-sensitive cell situated on the optical axis of the apparatus.

9. In apparatus for transmitting to a distance a reproduction of an object, the combination of a bank of image-casting devices to provide a plurality of images of the object, a movable image-casting device arranged to project a moving image of said plurality of images, a second oppositely-movable image-casting device arranged to reproject the moving images cast by the first-mentioned movable image-casting device and a light-sensitive cell so positioned on the optical axis of the apparatus as to have traversed across it the final image cast by the apparatus.

In testimony whereof I affix my signature.

JOHN LOGIE BAIRD.